United States Patent [19]

Cox

[11] 3,838,346

[45] Sept. 24, 1974

[54] BIPOLAR SAMPLE AND HOLD CIRCUIT WITH LOW-PASS FILTERING

[75] Inventor: Donald Clyde Cox, New Shrewsbury, N.J.

[73] Assignee: Bell Telephone Laboratories, Incorporated, Murray Hill, N.J.

[22] Filed: Nov. 1, 1973

[21] Appl. No.: 411,630

[52] U.S. Cl. .................. 328/151, 307/231, 307/229
[51] Int. Cl. .......................................... H03k 17/00
[58] Field of Search ......... 328/151; 307/231, 235 R, 307/236, 229, 238

[56] References Cited

UNITED STATES PATENTS

| | | | |
|---|---|---|---|
| 3,304,507 | 2/1967 | Weekes et al. | 328/151 |
| 3,611,164 | 10/1971 | Day | 328/151 |
| 3,694,668 | 9/1972 | Foerster | 328/151 X |

*Primary Examiner*—John Zazworsky
*Attorney, Agent, or Firm*—David L. Hurewitz

[57] ABSTRACT

A sample and hold circuit is disclosed which is directly responsive to a bipolar signal without the necessity for d.c. offset. The circuit is designed to be readily integrated and therefore contains neither inductors nor transformers. Leakage of a holding capacitor is blocked during a hold pulse by four reverse-biased diodes and a high input impedance device. When the circuit is tracking and the slope of the input signal is positive, a specified two of the four diodes are conducting and the other two are nonconducting. When the slope of the input signal is negative, the specified two diodes are nonconducting and the other two diodes are conducting. Low-pass filtering is incorporated into the circuit by a resistive arrangement in association with the holding capacitor.

10 Claims, 3 Drawing Figures

BIPOLAR SAMPLE AND HOLD CIRCUIT WITH LOW-PASS FILTERING

BACKGROUND OF THE INVENTION

1. Field of the Invention

This invention relates to sample and hold circuits and more particularly to sample and hold circuits which are responsive to bipolar input signals.

2. Description of the Prior Art

Sample and hold circuits are used in analog-to-digital converters and in data acquisition systems where simultaneous sampling of multiple inputs is required. Sample and hold circuits known in the prior art respond indirectly to a bipolar input signal by first offsetting the input signal with a d.c. signal to convert it to a unipolar signal and then holding a sample of the unipolar signal. After processing by the holding device, the unipolar signal is again offset to make it bipolar. Thus, two offsets are required and these two offsets introduce a possibility of error so that the twice offset signal may not be identical to the original bipolar input signal. In the prior art, if filtering such as low-pass filtering is required, it is conventionally provided by circuitry external to the sample and hold circuit.

SUMMARY OF THE INVENTION

In accordance with the invention, a sample and hold circuit is designed which is directly responsive to a bipolar input signal without d.c. offset and which utilizes the holding capacitor for low-pass filtering. Two operational amplifiers and two pairs of diodes are used. One operational amplifier and one pair of diodes respond to the input signal and conduct respectively when the input signal has a positive slope and the other operational amplifier and diode pair respond and conduct respectively when the input signal has a negative slope. Each operational amplifier has two feedback paths from its output to input. The sampled signal is held on a capacitor for the duration of a holding period and leakage of the capacitor is prevented by the two pairs of diodes which are both rendered nonconducting during the holding period.

DETAILED DESCRIPTION

Figure 1:
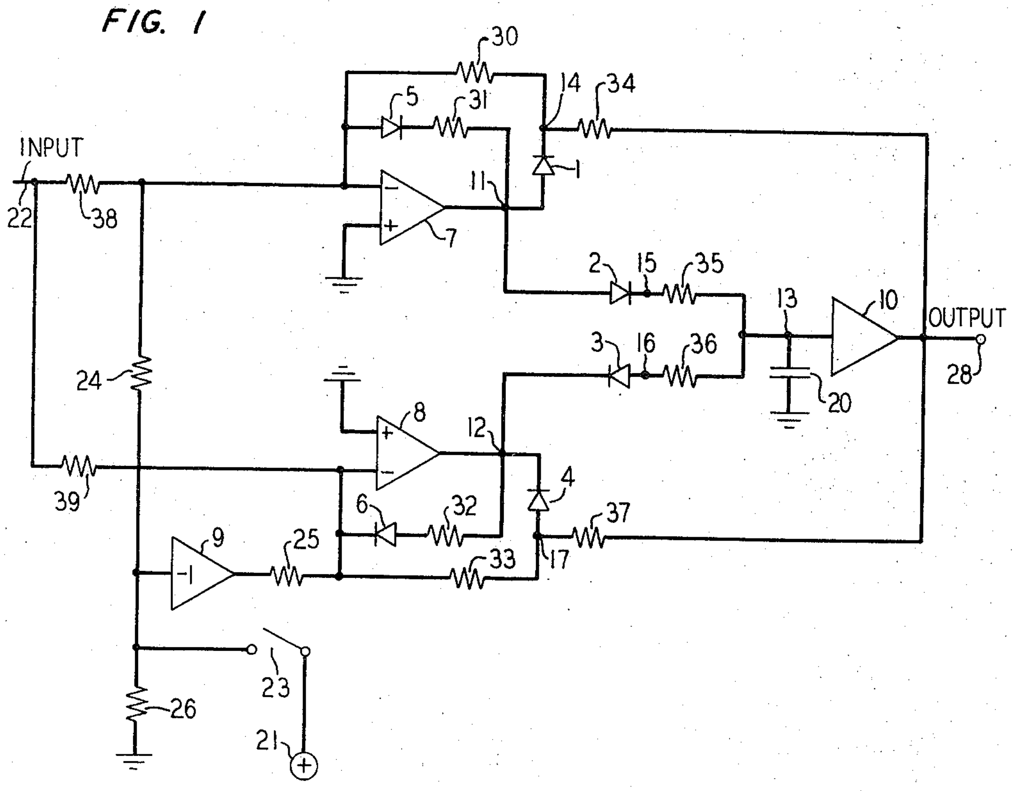
FIG. 1 is a schematic diagram of a sample and hold circuit in accordance with the invention.

In FIG. 1 two operational amplifiers 7 and 8 and the inverting amplifier 9 may be any appropriate devices available in the art such as FET amplifiers. With switch 23 open, the circuit is in the tracking mode and with the switch 23 closed, the circuit is in the hold mode.

The operation of the circuit shown in FIG. 1 may best be understood by first tracing a tracking mode cycle of operation and then tracing a hold mode cycle of operation. In the tracking mode, high gain operational amplifiers 7 and 8 invert a bipolar input signal (shown in FIG. 2) which is applied between input point 22 and ground and conducted to the amplifiers via resistors 38 and 39 to produce equal operational amplifier output signals (shown in FIG. 3) at each of nodes 11 and 12.

Figure 2:
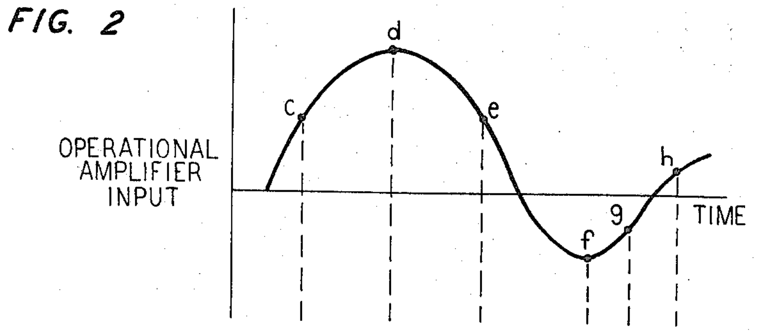
FIGS. 2 and 3 are graphical representations of waveforms helpful in explaining the operation of the circuit of FIG. 1.
Figure 3:
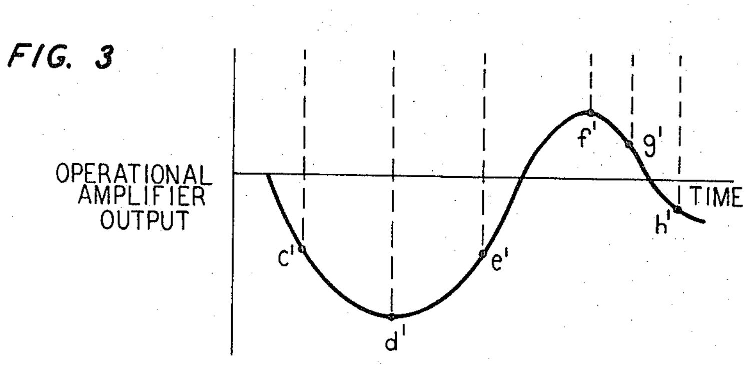

FIGS. 2 and 3 are merely convenient examples of waveforms used to explain the operation of the invention. It is understood that the invention is responsive to any periodic or nonperiodic analog input signal. Assuming the tracking circuit is initially operating and the bipolar input signal is on a positive slope portion of its wave such as at point *c* of FIG. 2 then both the signal and its slope are positive at *c*. Then at a corresponding time indicated by point *c* of FIG. 3, the output signals of the operational amplifiers are negative (inverted) and the slopes are negative. Accordingly, the equal operational amplifier output voltages at nodes 11 and 12 of FIG. 1 are negative and becoming more negative with time, as shown in FIG. 3, as the output signals move from point *c'* toward *d'*.

Since the voltage on holding capacitor 20 is lagging slightly behind the equal voltages at nodes 11 and 12 due to finite circuit resistances associated with diodes 2 and 3 and resistors 35 and 36, nodes 11 and 12 are negative with respect to node 13. Diodes 1 and 2 are reverse biased. Thus, no current flows through diodes 1 and 2. Similarly, diodes 3 and 4 are forward biased and negative charge flows from node 12 to node 13 making node 13 negative relative to ground and making the charge on capacitor 20 more negative than it was before. Thus, the voltage of capacitor 20 is tracking (following) the varying voltage at node 12. This tracking continues until the output of the operational amplifiers reach point *d'* of FIG. 3 where the slope equals zero. At this point, node 12 ceases to become more negative and the voltage at node 13 (voltage on capacitor 20) catches up to and equals the voltage at nodes 11 and 12. Thus, there is no voltage drop across any of the diodes 1, 2, 3 or 4 and no current flows through any of these diodes. As the operational amplifier output signals of FIG. 3 move from point *d'* toward *e'*, the signal becomes more positive (less negative) and the slope of the curve becomes positive. Now nodes 11 and 12 are positive with respect to node 13 since the voltage at node 13 (the voltage across capacitor 20) is lagging. Diodes 1 and 2 are therefore forward biased and diodes 3 and 4 are reverse biased. Accordingly, current passes from node 11 through diodes 1 and 2 to node 13 and capacitor 20 tending to discharge capacitor 20, thereby making the voltage of capacitor 20 more positive and approaching zero. Thus, in FIG. 3 as the signal moves from point *d'* toward the X axis, the capacitor tracks the operational amplifier output voltage at node 11. When the signal of FIG. 3 crosses the X axis, the circuit is still tracking and the capacitor voltage is almost equal to zero (the capacitor is almost discharged). The word "almost" is used because the capacitor voltage is lagging slightly the voltage at node 11 or 12. As the signal of FIG. 3 moves toward point *f'* from the X axis, the slope remains positive and nodes 11 and 12 remain positive relative to node 13. Accordingly, diodes 1 and 2 are still forward biased and capacitor 20 is still tracking but its voltage has changed polarity since node 13 is now positive relative to ground. At point *f'*, like point *d'* of FIG. 3, the slope of the curve is zero. The absolute value of the charge on capacitor 20 is a maximum, the voltage at node 13 has caught up to the voltage at node 11 and therefore no current flows through diodes 1, 2, 3 or 4. As the signal of FIG. 3 leaves *f'* and moves toward *g'*, it is still positive but is becoming more negative (less positive) because the slope has changed from positive to negative. Now nodes 11 and 12 are slightly negative with respect to node 13 and therefore diodes 1 and 2 are reverse biased, diodes 3 and 4 are forward biased, and capacitor 20 is tracking the voltage at node 12 and continues to do so as long as the slope of FIG. 3 remains negative. After the signal crosses the X axis again, the voltage on the capacitor equals zero and as the signal moves toward *h'* from the X axis, the capacitor voltage changes polarity and the capacitor begins to charge again.

Diodes 1 and 2 are a matched pair and operate together. Diodes 3 and 4 are likewise a matched pair and operate together. When diodes 1 and 2 are forward biased, diodes 3 and 4 are reverse biased and vice versa. The diode bias changes only when the slope of FIG. 3 changes from positive to negative or vice versa. At points where the slope equals zero, there is no diode bias and no voltage across the diodes and therefore no current flowing through the diodes. The polarity of capacitor 20 changes only after the output signal of FIG. 3 crosses the X axis.

A pair of alternative feedback paths are associated with each operational amplifier. One pair conducts from node 11 to the negative input of operational amplifier 7 and the other pair conducts from node 12 to the negative input of operational amplifier 8. When a diode pair 1 and 2 or 3 and 4 is reverse biased, the associated feedback loop containing respectively diode 5 and resistor 31 or diode 6 and resistor 32 is conducting since the feedback diode in this loop will be forward biased. (Diodes 1 and 5 are in electrical parallel and diodes 4 and 6 are in electrical parallel with respect to the input and output ports of operational amplifiers 7 and 8 respectively). Conduction through these two associated feedback loops prevents undesirable saturation of the operational amplifiers. The two other feedback loops around amplifiers 7 and 8, which contain resistors 30 and 33, respectively, control feedback when the associated matched diode pair is forward biased. By minimizing the effects of nonlinearities in diodes 1, 2, 3 and 4, these other feedback loops minimize distortion in the output at 28. Matched diodes have similar nonlinearities so current flow through diodes 1 and 2 affect voltages at nodes 14 and 15 identically in order to make the voltage at 14 equal the voltage at 15. Similarly matched diodes 3 and 4 cause the voltage at 16 to equal the voltage at 17. Resistors 34, 35, 36 and 37 are equal in magnitude so that the potential between nodes 14 and 15 equals zero and the potential between nodes 16 and 17 equals zero. Feedback paths containing resistors 34 and 37 serve to apply the output signal to nodes 14 and 17, respectively.

It is noted that resistors 35 and 36 and the holding capacitor 20 are arranged to function as a low-pass RC filter. These two resistors may be set equal to zero without interfering with either the tracking or the hold modes of operation. While filtering is not always necessary in conjunction with a sample and hold circuit, it is desirable for certain applications. For instance, low-pass filtering may be used in a closed feedback loop of a phase-locked loop where the phase-locked loop is used as a bandpass filter for received RF signals. In addition, low-pass filtering is often needed in analog-to-digital converters to restrict the bandwidth of a sampled input signal in order to prevent aliasing of high frequency components of the sampled signal into the low frequency portion of the sampled signal spectrum. It is convenient to incorporate the RC low-pass filter into the sample and hold circuit utilizing the circuit's holding capacitor. Thus, the capacitor performs the two functions of holding the sampled signal and serving as a component of the RC low-pass filter. If low-pass filtering were not so incorporated, then separate provision would have to be made external to the sample and hold circuit for such filtering. The incorporation of low-pass filtering into the sample and hold circuit obviously minimizes the total number of components needed.

The hold mode is activated by closing switch 23. Resistors 24, 25 and 26 and inverting amplifier 9 operate only in the hold mode. In the tracking mode, current in the hold mode through these latter elements is theoretically zero. A hold pulse is generated by closing switch 23 and allowing the d.c. supply voltage from source 21 to be applied to the negative inputs of operational amplifiers 7 and 8. The hold pulse is sufficiently positive and greater than the input voltage at 22 at all times, so that after inversion of the input signal by operational amplifier 7, the voltage at node 11 is always negative with respect to node 13. Therefore, diodes 1 and 2 are always reverse biased and cut off in the holding mode. Similarly, supply voltage at 21 is supplied to operational amplifier 8 via inverting amplifier 9 so that the voltage at node 12 is always positive with respect to node 13. Therefore, diodes 3 and 4 are always reverse biased and cut off in the holding mode so that capacitor 20 cannot leak through them. The output amplifier 10, which may exhibit unity gain, has a high input impedance to minimize capacitor 20 leakage. Capacitor 20 is thereby electrically isolated from the rest of the circuit during the hold mode and a sample voltage is held on this capacitor until it is measured. When switch 23 is opened, the negative charge at node 11 and the positive charge at node 12 are discharged to ground via operational amplifiers 7 and 8 and the circuit returns to the tracking mode.

The transient resulting when the circuit is switched from the tracking to the holding mode is not seen by the capacitor because the switching action instantaneously back biases diodes 1, 2, 3 and 4. The transient resulting when the circuit is switched from holding to the tracking mode facilitates charging of the capacitor in the direction necessary to track the input.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. An analog sample and hold circuit comprising first and second operational amplifiers;

network means for simultaneously applying an analog input signal to the two operational amplifiers;

first and second feedback means for feeding back the output of the first and second operational amplifiers to their respective inputs;

a capacitor for temporarily storing a sample of the input signal from the outputs of the first and second operational amplifiers;

filtering network means, including the capacitor, for low-pass filtering the outputs of the operational amplifiers and coupling both filtered outputs to an output terminal;

a first and a second means for coupling the filtered outputs at the output terminal to the first and second feedback means respectively;

switching means for temporarily applying a hold pulse through the operational amplifiers to the filtering network means;

said filtering means including means for blocking leakage from the capacitor to the operational amplifiers for the duration of the hold pulse.

2. A circuit as described in claim 1 wherein said filtering network means includes a high input impedance device connected between the capacitor and the output terminal.

3. A circuit as described in claim 2 wherein the high input impedance device is a unity gain amplifier and the capacitor is connected between the unity gain amplifier input and ground.

4. A circuit as described in claim 1 wherein each of said first and second feedback means includes two alternative paths between the output and input of its respective operational amplifier.

5. A circuit as described in claim 4 wherein the two alternative paths in each feedback means each include a diode, the diodes being connected with opposite polarities in each of the alternative paths of each feedback means.

6. A circuit as described in claim 1 wherein said means for blocking leakage is a pair of blocking diodes, each connected between the output of one of said operational amplifiers and the capacitor, said blocking diodes being connected in opposite polarity so that they conduct at mutually exclusive times, the amplitude of the hold pulse being greater than the amplitude of the input signal so that for the duration of a hold pulse both blocking diodes are rendered nonconductive, thereby preventing leakage of the capacitor into the operational amplifiers.

7. A circuit as described in claim 6 wherein a selected one diode in each feedback means is also rendered nonconducting by the hold pulse.

8. A circuit as described in claim 6 wherein each operational amplifier has a positive and a negative input terminal, one pair of like terminals being connected in common, said switching means including means for applying the hold pulse to the other terminal of the first operational amplifier directly and for applying an inverted hold pulse to the other terminal of the second operational amplifier.

9. An analog sample and hold circuit comprising:

an input applied simultaneously to negative terminals of two operational amplifiers, the positive terminals of which are grounded;

a capacitor;

an output amplifier;

the output of the output amplifier being coupled through a first resistor and a first diode connected in one polarity to the output of the first operational amplifier, the input of the output amplifier being connected directly to one side of the capacitor;

said first operational amplifier output also being coupled in series to a second diode connected in one polarity, a second resistor and said one side of the capacitor, the other side of said capacitor being grounded;

said output of the first operational amplifier also being coupled in series through a third resistor and a third diode of one polarity in series to the input of said first operational amplifier;

a fourth resistor connected from the negative terminal of the operational amplifier to a node between said first diode and first resistor;

the output of the output amplifier being coupled through a fifth resistor and fourth diode of the other polarity in series to the output of the second operational amplifier;

said output of the second operational amplifier also being coupled in series to a fifth diode of the other polarity and a sixth resistor to said one side of said capacitor;

said output of the second operational amplifier also being coupled in series through a seventh resistor and sixth diode of the other polarity to the input of said other operational amplifier;

an eighth resistor connected from the input of the second operational amplifier to a node between fourth diode and the fifth resistor;

a d.c. voltage source coupled through a switch to the negative terminal of the first operational amplifier, and coupled through the switch in series with an inverting amplifier to the negative terminal of the other operational amplifier.

10. An analog sample and hold circuit comprising a first operational amplifier;

a capacitor;

high input impedance means for isolating the capacitor;

means for feeding back the output of said first operational amplifier via a first pair of two alternative paths to the input of said first operational amplifier;

means for coupling the output of the high input impedance means to the output of the first operational amplifier;

another operational amplifier;

means for feeding back the output signal of said other operational amplifier via a second pair of two alternative paths to the input of said other operational amplifier;

means for coupling the output of the high input impedance means to the output of the other operational amplifier;

low-pass filtering means including the capacitor, for coupling the outputs of said first and said other operational amplifiers to the input of the high input impedance means;

a network means for applying an analog input signal simultaneously to both operational amplifiers;

switching means for temporarily applying a hold pulse through the operational amplifiers to the low-pass filtering network means to prevent leakage of the capacitor to the operational amplifiers for the duration of the hold pulse.

* * * * *